US012654208B2

(12) United States Patent
Lee

(10) Patent No.: US 12,654,208 B2
(45) Date of Patent: Jun. 16, 2026

(54) PART CLEANING APPARATUS AND PART CLEANING METHOD

(71) Applicant: SEMES CO., LTD., Cheonan-si (KR)

(72) Inventor: Seongsoo Lee, Suwon-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 216 days.

(21) Appl. No.: 18/504,782

(22) Filed: Nov. 8, 2023

(65) Prior Publication Data

US 2024/0149311 A1 May 9, 2024

(30) Foreign Application Priority Data

Nov. 9, 2022 (KR) ........................ 10-2022-0148786

(51) Int. Cl.
*H10P 72/00* (2026.01)
*B08B 3/08* (2006.01)
*B08B 3/12* (2006.01)
*B08B 13/00* (2006.01)

(52) U.S. Cl.
CPC .................. *B08B 3/12* (2013.01); *B08B 3/08* (2013.01); *B08B 13/00* (2013.01)

(58) Field of Classification Search
CPC ......... H01L 21/67017; H01L 21/67023; H01L 21/67028; H01L 21/6704; H01L 21/67051; H01L 21/67057; H01L 21/67075; H01L 21/6708; H01L 21/67086; H10P 72/0402; H10P 72/0404; H10P 72/0406; H10P 72/0411; H10P 72/0414; H10P 72/0426; H10P 72/0422; H10P 72/0424
See application file for complete search history.

(56) References Cited

U.S. PATENT DOCUMENTS 8,066,020 B2 11/2011 Tomita et al.
9,149,744 B2 * 10/2015 Morinaga .............. B01D 61/20
10,493,387 B2 12/2019 Yoshida et al.
2016/0035597 A1 * 2/2016 Hinode ............... H01L 21/6708 216/84
2019/0257679 A1 * 8/2019 Wiest ...................... G01F 1/662
2022/0301880 A1 * 9/2022 Yamashita ................ B08B 3/08
2023/0238254 A1 * 7/2023 Kim ..................... B01D 63/065 156/345.18

FOREIGN PATENT DOCUMENTS

JP H09-299767 A 11/1997
JP 2007-128958 A 5/2007
JP 2007-299767 A 11/2007
JP 2019-009215 A 1/2019
KR 10-2009-0038249 A 4/2009
KR 10-1581669 B1 1/2016
KR 10-2016-0064107 A 6/2016
KR 10-2020-0061237 A 6/2020

* cited by examiner

*Primary Examiner* — David G Cormier
(74) *Attorney, Agent, or Firm* — Harness, Dickey & Pierce, P.L.C.

(57) ABSTRACT

Provided is an apparatus for cleaning a part of a substrate processing apparatus, the apparatus including a chemical solution storage tank for storing a chemical solution, a filter configured to filter the chemical solution supplied from the chemical solution storage tank, a heater configured to heat the filtered chemical solution, and a vibrator arranged adjacent to the filter and configured to provide vibration to the filter.

17 Claims, 6 Drawing Sheets

PART CLEANING APPARATUS AND PART CLEANING METHOD

CROSS-REFERENCE TO RELATED APPLICATION

This application is based on and claims priority under 35 U.S.C. § 119 to Korean Patent Application No. 10-2022-0148786, filed on Nov. 9, 2022, in the Korean Intellectual Property Office, the disclosure of which is incorporated by reference herein in its entirety.

BACKGROUND

1. Field

The disclosure relates to an apparatus and method for cleaning a part of a substrate processing apparatus.

2. Description of the Related Art

In the fabrication of semiconductor devices or liquid-crystal displays, various processes, such as photolithography, etching, ion implantation, or thin-film deposition, are performed on substrates. Before or after the processes, a process of cleaning the substrates is performed to remove contaminants and particles generated in each process.

In such a cleaning process, liquid is supplied to the substrates to remove thin films or foreign substances, and particles generated during liquid treatment of the substrates are minimized.

However, some of the parts used in the cleaning process may react with a cleaning solution to generate particles, and depending on the durability of the parts, particles are generated during the operation of the parts. As the period of use of the parts increases, the amount of foreign substances accumulated on the parts also increases, and the accumulated foreign substances may be transferred and contaminate the substrates.

For this reason, as a method of cleaning the parts, immersing the parts in a cleaning solution 4 of a reservoir 2 as illustrated in FIG. 1 has been proposed. However, it is difficult for the cleaning solution to penetrate into microspaces within the parts, and particles are generated again when the parts operate after being cleaned.

SUMMARY

Provided are a part cleaning apparatus and a part cleaning method for improving cleaning power during substrate processing.

Provided are a part cleaning apparatus and a part cleaning method for preventing contamination of a part of a substrate processing apparatus.

Additional aspects will be set forth in part in the description which follows and, in part, will be apparent from the description, or may be learned by practice of the presented embodiments of the disclosure.

According to an aspect of the disclosure, an apparatus for cleaning a part of a substrate processing apparatus includes a chemical solution storage tank for storing a chemical solution, a filter configured to filter the chemical solution supplied from the chemical solution storage tank, a heater configured to heat the filtered chemical solution, and a vibrator arranged adjacent to the filter and configured to provide vibration to the filter.

In addition, the vibrator includes a first vibrator and a second vibrator, and each of the first vibrator and the second vibrator is in contact with a sidewall of the filter.

In addition, the apparatus further includes a clamp arranged adjacent to the filter, and the clamp fixes the vibrator to a sidewall of the filter.

In addition, the horizontal width of the clamp is less than the horizontal width of the vibrator.

In addition, the clamp includes a first clamp and a second clamp, and each of the first clamp and the second clamp is arranged spaced apart from the filter with the vibrator therebetween.

In addition, the apparatus further includes a chemical solution discharge pipe arranged between the chemical solution storage tank and the heater and configured to discharge the chemical solution that has passed through the heater.

In addition, the chemical solution discharge pipe discharges all of the chemical solution that has passed through the filter and the heater to prevent recontamination by the chemical solution.

In addition, the vertical length of the vibrator is less than the vertical length of the filter.

In addition, the vibrator prevents impurities from adhering to an inner wall of the filter.

In addition, the vibrator provides the filter with ultrasonic waves in a form of periodic pulses.

In addition, the chemical solution is isopropyl alcohol.

According to another aspect of the disclosure, an apparatus for cleaning a part of a substrate processing apparatus includes a chemical solution storage tank for storing a chemical solution, a filter configured to filter the chemical solution supplied from the chemical solution storage tank, a heater configured to heat the filtered chemical solution, a vibrator arranged adjacent to the filter and configured to provide ultrasonic vibration to an inside of the filter, and a first clamp and a second clamp arranged adjacent to the filter and configured to fix the vibrator to the filter, wherein the vibrator includes a first vibrator and a second vibrator, and the first vibrator and the second vibrator face each other with the filter therebetween.

In addition, the apparatus further includes a circulation line through which the chemical solution supplied from the chemical solution storage tank is circulated, wherein a chemical solution discharge pipe configured to discharge the chemical solution is arranged on the circulation line, and the filter, the heater, and the chemical solution discharge pipe are sequentially arranged on the circulation line.

In addition, a valve is arranged between the chemical solution storage tank and the filter, and the valve is configured to adjust the flow rate of the chemical solution supplied from the chemical solution storage tank.

In addition, the first vibrator and the second vibrator remove powder formed inside the filter.

In addition, the first clamp fixes the first vibrator to a sidewall of the filter, and the second clamp fixes the second vibrator to a sidewall of the filter.

In addition, the filter includes a lower portion, a central portion, and an upper portion, the lower portion and the upper portion each have a hemispherical shape, the central portion has a cylindrical shape, and the vibrator is attached to the central portion.

In addition, the first vibrator and the second vibrator are configured to generate microbubbles on an inner wall of the filter.

According to another aspect of the disclosure, an apparatus for cleaning a part of a substrate processing apparatus includes a chemical solution storage tank for storing and supplying a chemical solution, a filter arranged on a circulation line branching from the chemical solution storage tank and configured to filter the chemical solution supplied from the chemical solution storage tank, a heater arranged behind the filter and configured to heat the filtered chemical solution, a vibrator arranged adjacent to the filter and configured to provide an inside of the filter with ultrasonic vibration in a form of periodic pulses, a first clamp and a second clamp arranged adjacent to the filter to fix the vibrator to the filter, and a chemical solution discharge pipe arranged on the circulation line and configured to discharge the chemical solution that has passed through the heater, wherein the vibrator includes a first vibrator and a second vibrator, and the first vibrator and the second vibrator face each other with the filter therebetween.

In addition, the first vibrator and the second vibrator reduce a friction coefficient of an inner wall of the filter, and the chemical solution discharge pipe discharges all of the chemical solution supplied from the chemical solution storage tank and circulated along the circulation line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
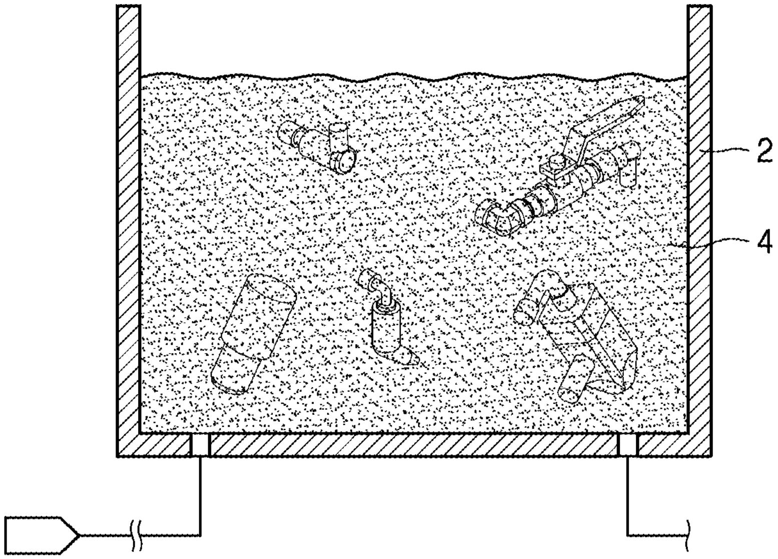
FIG. 1 is a diagram illustrating a general process of cleaning a part.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, embodiments will be described in detail with reference to the accompanying drawings, and the same or corresponding components will be denoted by the same reference numerals when described with reference to the accompanying drawings, and thus, their descriptions that are already provided will be omitted.

Figure 2:
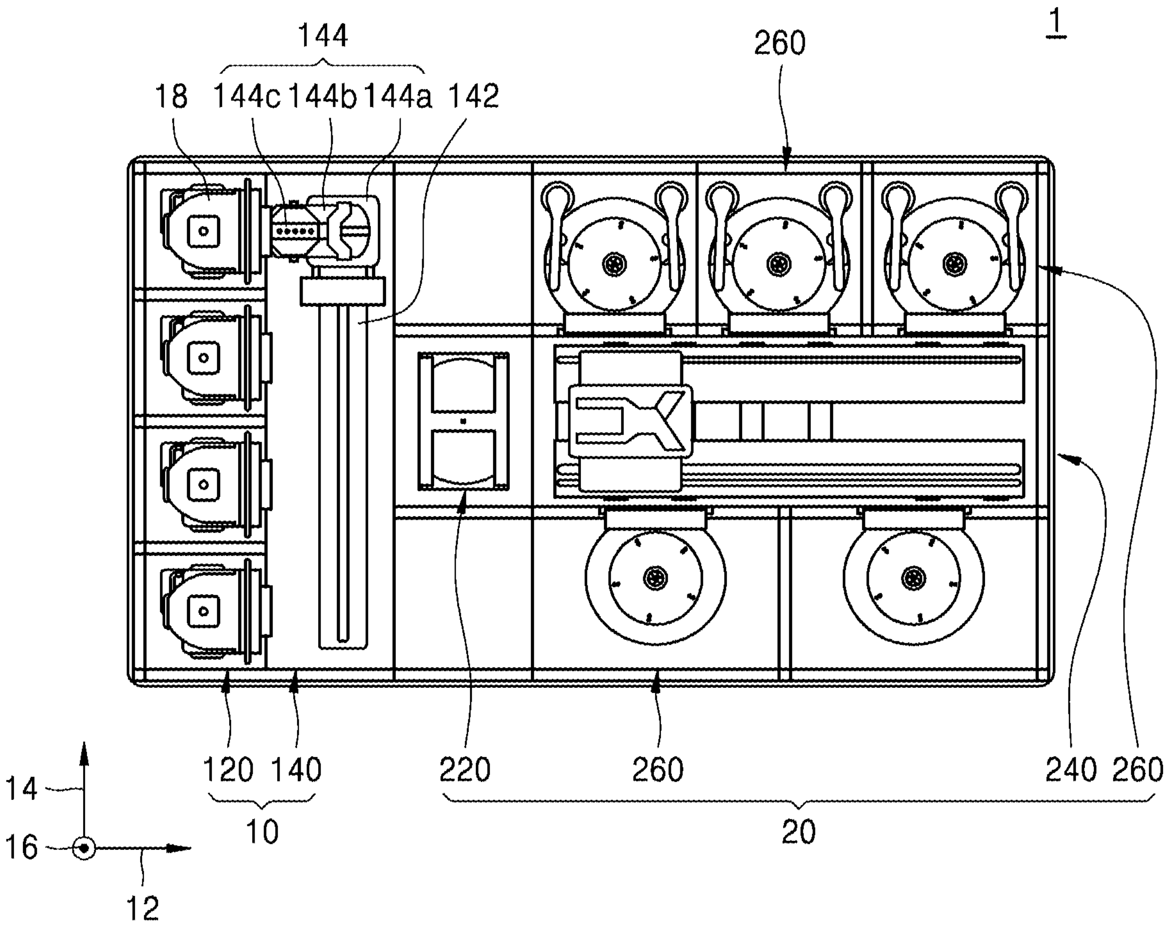
FIG. 2 is a plan view illustrating a substrate processing system according to an embodiment.

FIG. 2 is a plan view illustrating a substrate processing system according to an embodiment.

Referring to FIG. 2, a substrate processing system 1 may include an index module 10 and a processing module 20, and the index module 10 may include a load port 120 and a transfer frame 140. The load port 120, the transfer frame 140, and the processing module 20 may be sequentially arranged in a row. Hereinafter, the direction in which the load port 120, the transfer frame 140, and the processing module 20 are arranged is referred to as a first direction 12, a direction perpendicular to the first direction 12 when viewed from above is referred to as a second direction 14, and a direction perpendicular to a plane including the first direction 12 and the second direction 14 is referred to as a third direction 16.

A carrier 18 in which a substrate W is accommodated may be seated on the load port 120. A plurality of load ports 120 are provided and are arranged in a row in the second direction 14. FIG. 2 illustrates that four load ports 120 are provided. However, the number of load ports 120 may increase or decrease depending on conditions such as the process efficiency or footprint of the processing module 20.

A slot (not shown) provided to support an edge of the substrate may be formed in the carrier 18. A plurality of slots may be provided in the third direction 16, and substrates may be stacked and placed in the carrier to be spaced apart from each other in the third direction 16. A front-opening unified pod (FOUP) may be used as the carrier 18.

The processing module 20 may include a buffer unit 220, a transfer chamber 240, and a process chamber 260. The transfer chamber 240 may be arranged such that the lengthwise direction thereof is parallel to the first direction 12. Process chambers 260 may be arranged on both sides of the transfer chamber 240 in the second direction 14. The process chambers 260 may be provided symmetrically to each other with respect to the transfer chamber 240.

Some of the process chambers 260 may be arranged in the lengthwise direction of the transfer chamber 240. In addition, some of the process chambers 260 may be stacked with each other. That is, the process chambers 260 may be arranged on both sides of the transfer chamber 240 in an array of A×B (where each of A and B is a natural number greater than or equal to 1). Here, A denotes the number of process chambers 260 provided in a row in the first direction 12, and B denotes the number of process chambers 260 provided in a row in the third direction 16. In a case in which four or six process chambers 260 are provided on each of both sides of the transfer chamber 240, the process chambers 260 may be arranged in arrays of 2×2 or 3×2 on both sides, respectively. The number of process chambers 260 may increase or decrease.

Unlike the above description, the process chambers 260 may be provided on only one side of the transfer chamber 240. In addition, the process chambers 260 may be provided in a single layer on one side and the other side of the transfer chamber 240. In addition, the process chamber 260 may be provided in various arrangements unlike the above description. In addition, the process chambers 260 provided on one side of the transfer chamber 240 may perform a liquid treatment process on the substrate, and the process chambers 260 provided on the other side of the transfer chamber 240 may perform a drying process on the substrate on which the liquid treatment process has been performed. The drying process may be a supercritical process.

The buffer unit 220 may be arranged between the transfer frame 140 and the transfer chamber 240. The buffer unit 220 may provide a space in which the substrate W stays before being transferred between the transfer chamber 240 and the transfer frame 140. A slot (not shown) in which the substrate W is placed may be provided in the buffer unit 220, and a plurality of slots (not shown) may be provided to be spaced apart from each other in the third direction 16. In the buffer unit 220, a surface facing the transfer frame 140 and a surface facing the transfer chamber 240 may be opened.

The transfer frame 140 may transfer the substrate W between the carrier 18 seated on the load port 120, and the buffer unit 220. An index rail 142 and an index robot 144 may be provided in the transfer frame 140. The index rail 142 may be arranged such that the lengthwise direction thereof is parallel to the second direction 14. The index robot 144 may be installed on the index rail 142 and may linearly move along the index rail 142 in the second direction 14.

The index robot 144 may include a base 144*a*, a body 144*b*, and an index arm 144*c*. The base 144*a* may be installed to be movable along the index rail 142. The body 144*b* may be coupled to the base 144*a*. The body 144*b* may be provided to be movable on the base 144*a* in the third direction 16.

In addition, the body 144*b* may be rotatably provided on the base 144*a*. The index arm 144*c* may be coupled to the body 144*b* and may be provided to be movable forward and backward with respect to the body 144*b*. A plurality of index arms 144*c* may be provided to be individually driven. The index arms 144*c* may be stacked to be spaced apart from each other in the third direction 16.

Some of the index arms 144*c* may be used to transfer the substrate W from the processing module 20 to the carrier 18, and the other index arms 144*c* may be used to transfer the substrate W from the carrier 18 to the processing module 20. This may prevent particles generated from the substrate W before a process from being attached to the substrate W after the process when the index robot 144 loads and unloads the substrate W.

Hereinafter, a substrate processing apparatus 300 provided in the process chamber 260 will be described. In the present embodiment, an example will be described in which the substrate processing apparatus 300 performs a liquid treatment process on a substrate. The liquid treatment process may include a process of cleaning a substrate or removing a film formed on the substrate.

Figure 3:
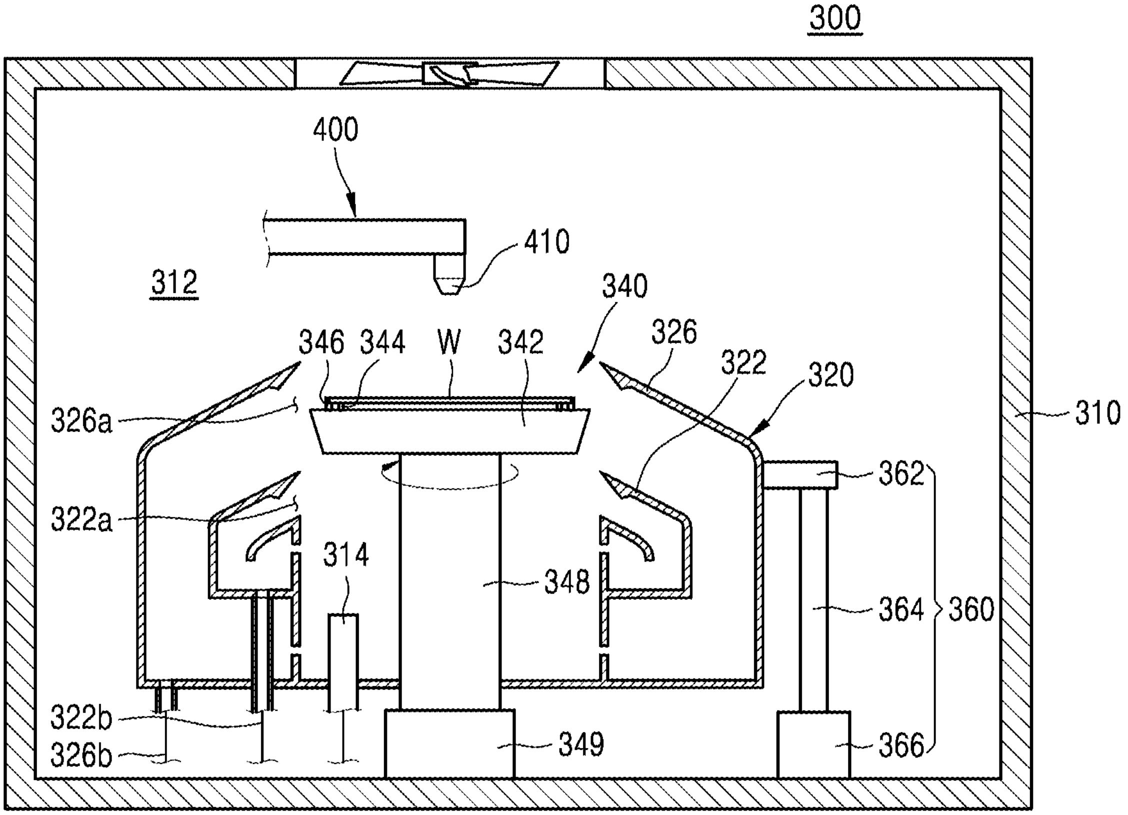
FIG. 3 is a cross-sectional view illustrating a substrate processing apparatus according to an embodiment.

FIG. 3 is a cross-sectional view illustrating the substrate processing apparatus of FIG. 2. Referring to FIG. 3, the substrate processing apparatus 300 may include a chamber 310, a process vessel 320, a spin head 340, an lifting unit 360, and a liquid supply unit 400. The chamber 310 may provide a processing space 312 in which a process is performed on the substrate W. An exhaust pipe 314 may be installed on the bottom surface of the chamber 310. The exhaust pipe 314 is provided as a pipe for exhausting the processing space 312. A depressurizing member may be installed in the exhaust pipe 314.

The process vessel 320 may be located in the processing space 312 and may be provided in a cup shape with an open top. When viewed from above, the process vessel 320 may be arranged to overlap the exhaust pipe 314. The process vessel 320 may include an inner recovery container 322 and an outer recovery container 326. Each of the inner and outer recovery containers 322 and 326 may recover different treatment solutions from among treatment solutions used in a process.

The inner recovery container 322 may be provided in an annular shape surrounding the spin head 340, and the outer recovery container 326 may be provided in an annular shape surrounding the inner recovery container 322. An inner space 322*a* of the inner recovery container 322 and a space 326*a* between the outer recovery container 326 and the inner recovery container 322 may serve as inlets through which treatment solutions flows into the inner recovery container 322 and the outer recovery container 326, respectively.

Recovery lines 322*b* and 326*b* may be connected to the inner and outer recovery containers 322 and 326, respectively, to extend perpendicularly downward from the bottom surface of the inner and outer recovery containers 322 and 326. The recovery lines 322*b* and 326*b* may serve as discharge pipes for discharging the treatment solutions introduced through the inner and outer recovery containers 322 and 326, respectively. The discharged treatment solutions may be reused through an external treatment solution recycling system (not shown).

The spin head 340 may be provided as a substrate support unit 340 that supports and rotates the substrate W. The spin head 340 may be arranged inside the process vessel 320. The spin head 340 may support and rotate the substrate W during a process.

The spin head 340 may include a body 342, a support pin 344, a chuck pin 346, and a support shaft 348. The body 342 may include an upper surface provided in a substantially circular shape when viewed from above. The support shaft 348 rotatable by a motor 349 may be fixedly coupled to the bottom surface of the body 342.

A plurality of support pins 344 may be provided. The support pins 344 may be arranged on an edge of the upper surface of the body 342 to be spaced apart from each other at preset intervals, and may protrude upward from the body 342. The support pins 334 may be arranged to form an annular shape as a whole by combination with each other. The support pins 344 may support an rear edge of the substrate W such that the substrate W is spaced apart from the upper surface of the body 342 by a preset distance.

A plurality of chuck pins 346 are provided. The chuck pins 346 may be arranged farther from the center of the body 342 than the support pins 344. The chuck pins 346 may be provided to protrude upward from the body 342. When the spin head 340 is rotated, the chuck pins 346 may support a lateral portion of the substrate W such that the substrate W does not deviate from its original position in a lateral direction. The chuck pins 346 may be provided to be linearly movable between a standby position and a support position in the radial direction of the body 342.

The standby position may be a position farther from the center of the body 342 than the support position. When the substrate W is loaded onto or unloaded from the spin head 340, the chuck pins 346 may be arranged at the standby position. When a process is performed on the substrate W, the chuck pins 346 may be arranged at the support position. In the support position, the chuck pins 346 may be in contact with the lateral portion of the substrate W.

The lifting unit 360 may adjust the relative height between the process vessel 320 and the spin head 340. The lifting unit 360 may linearly move the process vessel 320 upward or downward. As the process vessel 320 is moved upward or downward, the relative height of the process vessel 320 with respect to the spin head 340 may be changed.

The lifting unit 360 may include a bracket 362, a moving shaft 364, and a driver 366. The bracket 362 may be fixedly installed on an outer wall of the process vessel 320. The moving shaft 364 movable in upward or downward by the driver 366 may be fixedly coupled to the bracket 362.

When the substrate W is placed on or lifted from the spin head 340, the process vessel 320 may descend such that the spin head 340 protrudes upward from the process vessel 320. In addition, when a process is in progress, the height of the process vessel 320 may be adjusted such that treatment solutions supplied to the substrate W flow into the inner and outer recovery containers 322 and 326, respectively, according to the types of the treatment solutions.

Unlike the above description, the lifting unit 360 may move the spin head 340, instead of the process vessel 320, upward or downward.

The liquid supply unit 400 may supply various types of treatment solutions onto the substrate W. The liquid supply unit 400 supplies a treatment solution for cleaning the substrate W or removing a film on the substrate W. A nozzle 410 is moved between a process position and a standby position. Here, the process position is defined as a position where the nozzle 410 may discharge a treatment solution onto the substrate W located in the process vessel 320, and the standby position is defined as a position where the nozzle 410 stands by after leaving the process position.

For example, the process position may be a position where the nozzle 410 may supply liquid to the center of the substrate W. For example, when viewed from above, the nozzle 410 may be linearly moved or axially rotated between the process position and the standby position. The treatment solution may be a chemical, a rinse solution, or an organic solvent. The chemical may be a strongly acidic or strongly basic solution.

A part cleaning apparatus 1000 may be provided as an apparatus for cleaning a part of a substrate processing apparatus. The part cleaning apparatus 1000 may be arranged outside a substrate processing system. However, the position of the part cleaning apparatus 1000 is not limited and may be in any one of empty spaces of the substrate processing system.

Figure 4:
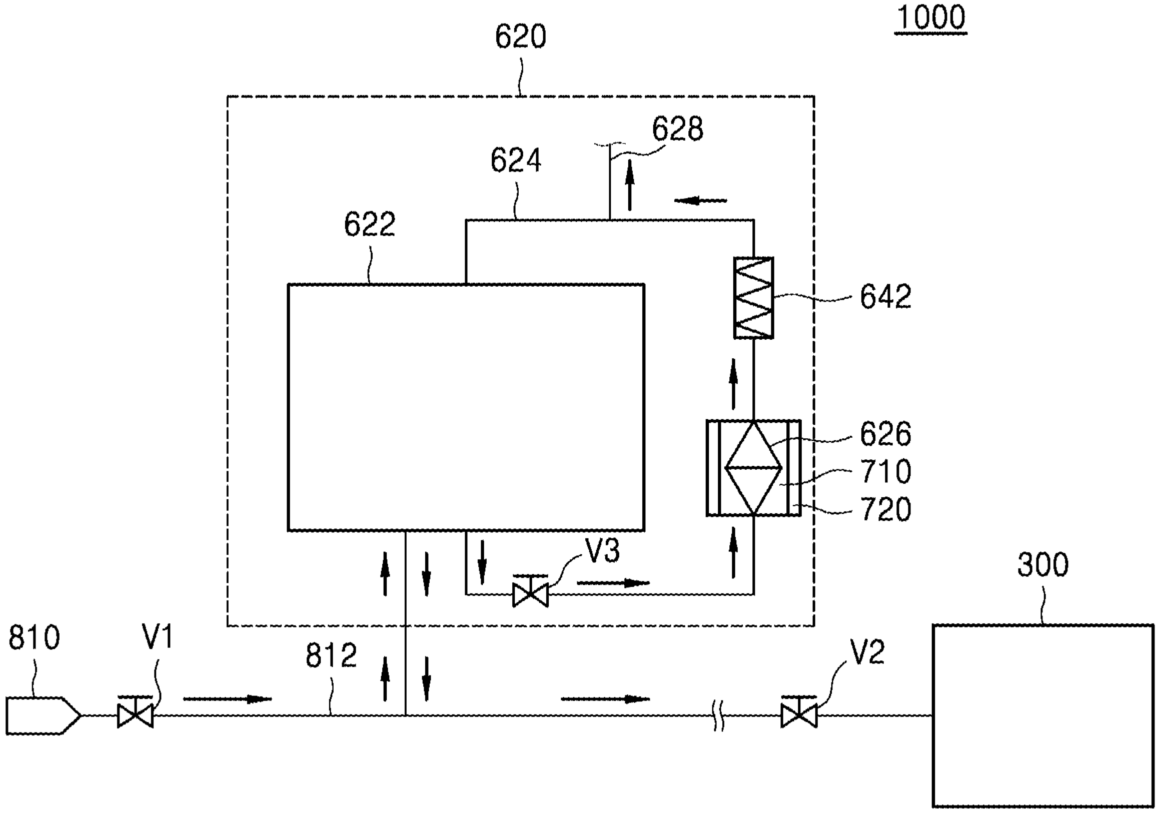
FIG. 4 is a diagram illustrating a part cleaning apparatus according to an embodiment.
Figure 5:
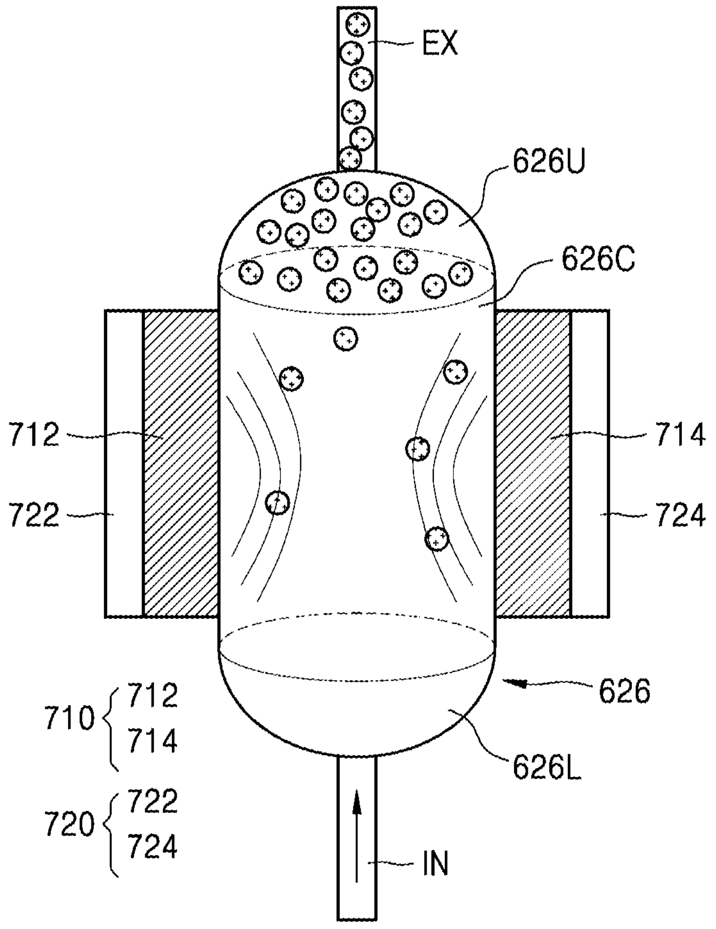
FIG. 5 is a partially enlarged view illustrating a filter and a vibrator of FIG. 4.

FIG. 4 is a diagram illustrating a part cleaning apparatus according to an embodiment. FIG. 5 is a partially enlarged view illustrating a filter and a vibrator of FIG. 4. Hereinafter, descriptions will be provided with reference to FIGS. 2 and 3, and descriptions already provided above with reference to FIGS. 2 and 3 will be briefly provided or omitted.

Referring to FIGS. 4 and 5, a part cleaning apparatus 1000 may include a rinse solution supply unit 810, a liquid supply unit 620, and the substrate processing apparatus 300. The rinse solution supply unit 810 may supply a rinse solution. The rinse solution supply unit 810 may include a rinse solution tank. In addition, the rinse solution may be accommodated in the rinse solution tank. However, the disclosure is not limited thereto, and the rinse solution supply unit 810 may include a plurality of rinse solution supply units. The rinse solution supply unit 810, the liquid supply unit 620 and the substrate processing apparatus 300 may be connected to each other through a main line 812. A first valve V1 and a second valve V2 may be arranged on the main line 812. Each of the first valve V1 and the second valve V2 may be opened and closed to adjust the flow rate of a fluid flowing in the main line 812.

The liquid supply unit 620 may include a chemical solution storage tank 622, a third valve V3, a filter 626 and, a heater 642. The chemical solution storage tank 622 may store a chemical solution. Although FIG. 4 illustrates only one chemical solution storage tank 622, a plurality of chemical solution storage tanks 622 may be provided. Here, supply of the chemical solution to the chemical solution storage tank 622 may be mainly performed by an external large-capacity storage tank.

The filter 626 may filter the chemical solution being supplied to a substrate. The filter 626 may filter out foreign substances remaining in the chemical solution being supplied to the substrate. The filter 626 may include a membrane structure. The filter 626 may include a lower portion 626L, a central portion 626C, and an upper portion 626U. The lower portion 626L and the upper portion 626U may have a hemispherical shape. In addition, the central portion 626C may have a cylindrical shape. A vibrator 710 may be attached to the central portion 626C. The chemical solution may flow into the filter 626 through an inlet pipe IN connected to the lower portion 626L. In addition, the chemical solution filtered in the filter 626 may be discharged from the filter 626 through an outlet pipe EX connected to the upper portion 626U.

The heater 642 may cause the chemical solution being supplied to the substrate to have a temperature suitable for process conditions. That is, the heater 642 may heat the chemical solution. The heater 642 may be arranged on a circulation line 624 and behind the filter 626. That is, the filter 626, the heater 642, and a chemical solution discharge pipe 628 may be sequentially arranged on the circulation line 624.

In addition, the liquid supply unit 620 may include a pumping unit (not shown). The pumping unit may be provided to supply the chemical solution from the chemical solution storage tank 622 to the substrate by performing a pumping operation. The pumping unit may be arranged on a supply line and may include a rotary pump. Here, the supply line may refer to a path for supplying the chemical solution from the liquid supply unit 620 to the substrate. The third valve V3 may be arranged on the supply line and may adjust the flow rate of the chemical solution.

The liquid supply unit 620 may supply the chemical solution. The chemical solution may include a chemical and a rinse solution. The chemical may be a removal solution that removes foreign substances or particles attached to a part. In embodiments, the chemical may be an acidic or basic solution. In addition, the chemical may be sulfuric acid ($H_2SO_4$), hydrofluoric acid (HF) or hydrogen peroxide ($H_2O_2$). The rinse solution may be provided as a solution that rinses a part having been cleaned by the chemical.

In addition, the liquid supply unit 620 may include the vibrator 710 and a clamp 720. The vibrator 710 may include a plurality of vibrators and may include a first vibrator 712 and a second vibrator 714. The clamp 720 may include a plurality of clamps and may include a first clamp 722 and a second clamp 724.

Each of the first vibrator 712 and the second vibrator 714 may surround the filter 626. Each of the first vibrator 712 and the second vibrator 714 may be in contact with a sidewall of the filter 626. Each of the first vibrator 712 and the second vibrator 714 may generate ultrasonic waves inside the filter 626. Accordingly, each of the first vibrator 712 and the second vibrator 714 may generate microbubbles on the inner wall of the filter 626. The microbubbles may include bubbles having an average bubble diameter of 100 μm or less.

The first vibrator 712 and the second vibrator 714 may face each other with the filter 626 therebetween. The frequency of the ultrasonic waves generated by the first vibrator 712 and the frequency of the ultrasonic waves generated by the second vibrator 714 may be equal to each other. Alternatively, the frequency of the ultrasonic waves generated by the first vibrator 712 and the frequency of the ultrasonic waves generated by the second vibrator 714 may be different from each other. Each of the first vibrator 712 and the second vibrator 714 may provide ultrasonic waves in the form of periodic pulses to the inside of the filter 626.

The first vibrator 712 and the second vibrator 714 may prevent impurities from being attached to the inner wall of the filter 626. In addition, the first vibrator 712 and the second vibrator 714 may separate powder formed on the inner wall of the filter 626. That is, the first vibrator 712 and the second vibrator 714 may remove the powder fixedly accumulated inside the filter 626. In embodiments, the first vibrator 712 and the second vibrator 714 may desorb foreign substances by a bubble effect of cavitation. The cavitation includes the formation of cavities, and may refer to a phenomenon in which cavities are formed in a chemical solution due to a change in pressure due to a change in speed of the chemical solution.

In some embodiments, the first vibrator 712, the second vibrator 714, the first clamp 722 and the second clamp 724 may be coupled to, in addition to the filter 626, components arranged on the circulation line 624. For example, they may be attached to a pipe to apply vibration to a chemical solution flowing through the pipe.

The first clamp 722 and the second clamp 724 may be arranged adjacent to the filter 626. For example, the first clamp 722 and the second clamp 724 may be arranged to be spaced apart from the filter 626 with the vibrator 710 therebetween. The first clamp 722 and the second clamp 724 may fix the vibrator 710 to a sidewall of the filter 626. For example, the first clamp 722 may fix the first vibrator 712 to a sidewall of the filter 626. In addition, the second clamp 724 may fix the second vibrator 714 to a sidewall of the filter 626.

The horizontal widths of the first clamp 722 and the second clamp 724 may be less than the horizontal width of the vibrator 710. In addition, the vertical lengths of the first clamp 722 and the second clamp 724 may be equal to the vertical lengths of the first vibrator 712 and the second vibrator 714, respectively.

The liquid supply unit 620 may further include the chemical solution discharge pipe 628. The chemical solution discharge pipe 628 may be arranged on the circulation line 624. The circulation line 624 may connect the chemical solution storage tank 622 to the third valve V3, the third valve V3 to the filter 626, the filter 626 to the heater 642, and the heater 642 to the chemical solution storage tank 622. The chemical solution discharge pipe 628 may be arranged behind the heater 642. That is, the chemical solution discharge pipe 628 may be arranged between the chemical solution storage tank 622 and the heater 642. The chemical solution discharge pipe 628 may discharge the chemical solution that has passed through the heater 642. The chemical solution discharge pipe 628 may discharge all of the chemical solution that has passed through the filter 626 and the heater 642. Accordingly, it is possible to prevent recontamination by the chemical solution.

Figure 6:
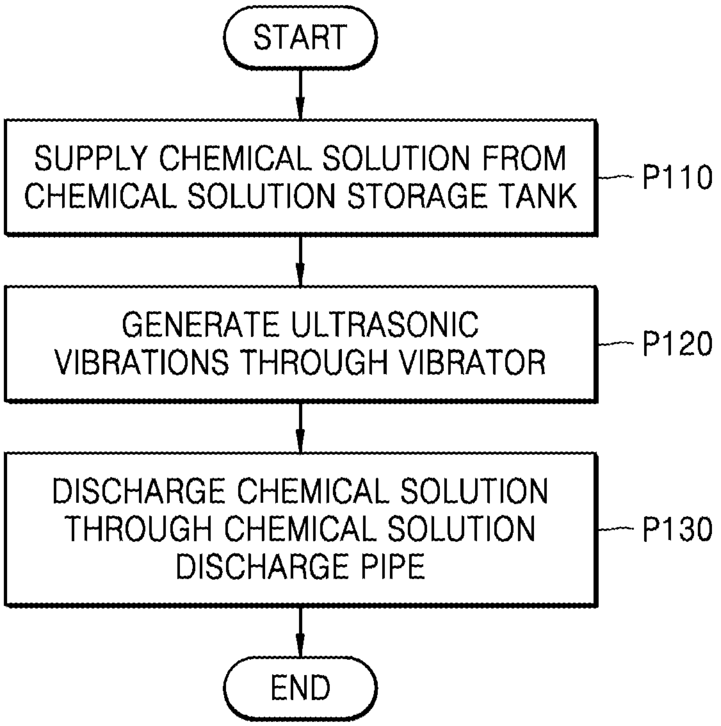
FIG. 6 is a flowchart of a part cleaning method according to an embodiment.

FIG. 6 is a flowchart of a part cleaning method according to an embodiment. Hereinafter, descriptions will be provided with reference to FIGS. 1 to 5, and descriptions already provided above with reference to FIGS. 1 to 5 will be briefly provided or omitted.

Referring to FIG. 6, first, the part cleaning apparatus 1000 may supply a chemical solution to the circulation line 624 (P110). The chemical solution may sequentially pass through the third valve V3, the filter 626, and the heater 642.

Next, ultrasonic vibration may be formed or generated inside the filter 626 through the vibrator 710 attached to the filter 626 (P120). The chemical solution may be vibrated inside the filter 626 by the ultrasonic vibration. Accordingly, the inside of the filter 626 may be efficiently cleaned.

After generating the ultrasonic vibration, the chemical solution may be discharged through the chemical solution discharge pipe 628 (P130). Accordingly, it is possible to prevent the chemical solution from flowing into the chemical solution storage tank 622 through the circulation line 624. In addition, it is possible to prevent a chemical solution in the chemical solution storage tank 622 from being contaminated by the chemical solution flowing into the chemical solution storage tank 622.

While the embodiments have been particularly illustrated and described with reference to the accompanying drawings, it will be understood by those of skill in the art that various changes in form and details may be made therein without departing from the spirit and scope of the disclosure. Therefore, it should be understood that the above-described embodiments are exemplary in all respects and do not limit the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for cleaning a part of a substrate processing apparatus, the apparatus comprising:
- a chemical solution storage tank for storing a chemical solution;
- a circulation line configured to circulate the chemical solution from the chemical solution storage tank;
- a filter configured to filter the chemical solution supplied from the chemical solution storage tank;
- a heater configured to heat the filtered chemical solution; and
- a vibrator arranged adjacent to the filter and configured to provide vibration to the filter, the filter and the heater are on the circulation line and are spaced apart from each other along the circulation line, the vibrator is outside the filter adjacent to am outer wall of the filter;
- chemical solution discharge pipe on the circulation line downstream of the heater and configured to discharge all of the chemical solution that has passed through the heater;
- a main line configured to supply a rinse solution to the substrate processing apparatus; and
- a connection line branching from the main line and connecting the chemical solution storage tank to the main line, such that the circulation line is separate from the main line,
- wherein, based on all of the chemical solution discharging through the chemical solution discharge pipe without recirculation, the vibrator is configured to provide vibration to the filter.

2. The apparatus of claim 1, wherein the vibrator comprises a first vibrator and a second vibrator, and
- each of the first vibrator and the second vibrator is in contact with a sidewall of the filter.

3. The apparatus of claim 1, further comprising a clamp arranged adjacent to the filter,
- wherein the clamp fixes the vibrator to a sidewall of the filter.

4. The apparatus of claim 3, wherein a horizontal width of the clamp is less than a horizontal width of the vibrator.

5. The apparatus of claim 3, wherein the clamp comprises a first clamp and a second clamp, and
- each of the first clamp and the second clamp is arranged spaced apart from the filter with the vibrator therebetween such that each of the first clamp and the second clamp do not contact the filter.

6. The apparatus of claim 1, wherein a vertical length of the vibrator is less than a vertical length of the filter.

7. The apparatus of claim 1, wherein the vibrator prevents impurities from adhering to an inner wall of the filter.

8. The apparatus of claim 1, wherein the vibrator provides the filter with ultrasonic waves in a form of periodic pulses.

9. The apparatus of claim 1, wherein the chemical solution is isopropyl alcohol.

10. An apparatus for cleaning a part of a substrate processing apparatus, the apparatus comprising:

a chemical solution storage tank for storing a chemical solution;

a circulation line configured to circulate the chemical solution from the chemical solution storage tank;

a filter configured to filter the chemical solution supplied from the chemical solution storage tank;

a heater configured to heat the filtered chemical solution;

a vibrator arranged adjacent to the filter and configured to provide ultrasonic vibration to an inside of the filter, the filter and the heater are on the circulation line and are spaced apart from each other along the circulation line, the vibrator is outside the filter adjacent to an outer wall of the filter;

a first clamp and a second clamp, which are arranged adjacent to the filter to fix the vibrator to the filter;

a chemical solution discharge pipe on the circulation line downstream of the heater and configured to discharge all of the chemical solution that has passed through the heater;

a main line configured to supply a rinse solution to the substrate processing apparatus; and a connection line branching from the main line and connecting the chemical solution storage tank to the main line, such that the circulation line is separate from the main line, wherein, based on all of the chemical solution discharging through the chemical solution discharge pipe without recirculation, the vibrator is configured to provide vibration to the filter, wherein the vibrator comprises a first vibrator and a second vibrator, and the first vibrator and the second vibrator face each other with the filter therebetween.

11. The apparatus of claim 10, wherein a valve is arranged between the chemical solution storage tank and the filter, and the valve is configured to adjust a flow rate of the chemical solution supplied from the chemical solution storage tank.

12. The apparatus of claim 10, wherein the first vibrator and the second vibrator are configured to remove powder formed inside the filter.

13. The apparatus of claim 10, wherein the first clamp fixes the first vibrator to a sidewall of the filter, and the second clamp fixes the second vibrator to a sidewall of the filter.

14. The apparatus of claim 10, wherein the filter comprises a lower portion, a central portion, and an upper portion, the lower portion and the upper portion each have a hemispherical shape, the central portion has a cylindrical shape, and the vibrator is attached to the central portion.

15. The apparatus of claim 10, wherein the first vibrator and the second vibrator are configured to vibrate to generate microbubbles on an inner wall of the filter.

16. An apparatus for cleaning a part of a substrate processing apparatus, the apparatus comprising:

a chemical solution storage tank for storing and supplying a chemical solution;

a circulation line configured to circulate the chemical solution from the chemical solution storage tank;

a filter arranged on a circulation line branching from the chemical solution storage tank and configured to filter the chemical solution supplied from the chemical solution storage tank;

a heater arranged behind the filter and configured to heat the filtered chemical solution;

a vibrator arranged adjacent to the filter and configured to provide an inside of the filter with ultrasonic vibration in a form of periodic pulses, the filter and the heater are on the circulation line and are spaced apart from each other along the circulation line, the vibrator is outside the filter adjacent to an outer wall of the filter;

a first clamp and a second clamp, which are arranged adjacent to the filter and configured to fix the vibrator to the filter;

a chemical solution discharge pipe arranged on the circulation line and configured to discharge the chemical solution that has passed through the heater;

a main line configured to supply a rinse solution to the substrate processing apparatus; and a connection line branching from the main line and connecting the chemical solution storage tank to the main line, such that the circulation line is separate from the main line, wherein, based on all of the chemical solution discharging through the chemical solution discharge pipe without recirculation, the vibrator is configured to provide vibration to the filter, wherein the vibrator comprises a first vibrator and a second vibrator, and the first vibrator and the second vibrator face each other with the filter therebetween.

17. The apparatus of claim 16, wherein the first vibrator and the second vibrator reduce a friction coefficient of an inner wall of the filter.

* * * * *